US012808202B2

(12) United States Patent
Abe et al.

(10) Patent No.: US 12,808,202 B2
(45) Date of Patent: Nov. 24, 2026

(54) ARTICLE WITH A FILM ADHERED AND LAMINATE

(71) Applicant: 3M INNOVATIVE PROPERTIES COMPANY, St. Paul, MN (US)

(72) Inventors: Hidetoshi Abe, Yamagata (JP); Eumi Pyun, St. Paul, MN (US); Shinsuke Kondo, Yamagata (JP); Lynn E. Lorimor, Minneapolis, MN (US); Masaaki Furusawa, Yamagata (JP)

(73) Assignee: 3M Innovative Properties Company, St. Paul, MN (US)

( * ) Notice: Subject to any disclaimer, the term of this patent is extended or adjusted under 35 U.S.C. 154(b) by 413 days.

(21) Appl. No.: 18/271,578

(22) PCT Filed: Jan. 10, 2022

(86) PCT No.: PCT/IB2022/050157

§ 371 (c)(1),
(2) Date: Jul. 10, 2023

(87) PCT Pub. No.: WO2022/157594

PCT Pub. Date: Jul. 28, 2022

(65) Prior Publication Data

US 2024/0309646 A1 Sep. 19, 2024

(30) Foreign Application Priority Data

Jan. 19, 2021 (JP) ................................ 2021-006654

(51) Int. Cl.

| | |
|---|---|
| ***E04F 13/08*** | (2006.01) |
| ***B32B 13/12*** | (2006.01) |
| ***B32B 27/10*** | (2006.01) |
| ***B32B 27/20*** | (2006.01) |
| ***B32B 27/30*** | (2006.01) |

(52) U.S. Cl.

CPC .......... *E04F 13/0866* (2013.01); *B32B 13/12* (2013.01); *B32B 27/10* (2013.01); *B32B 27/20* (2013.01); *B32B 27/304* (2013.01); *B32B 2255/10* (2013.01); *B32B 2255/12* (2013.01); *B32B 2255/20* (2013.01); *B32B 2255/26* (2013.01); *B32B 2255/28* (2013.01); *B32B 2264/1022* (2020.08); *B32B 2307/3065* (2013.01); *B32B 2307/4026* (2013.01); *B32B 2307/748* (2013.01)

(58) Field of Classification Search

None

See application file for complete search history.

(56) References Cited

U.S. PATENT DOCUMENTS

| | | | |
|---|---|---|---|
| 5,780,142 | A | 7/1998 | Kume et al. |
| 6,656,567 | B1 | 12/2003 | Abe et al. |
| 7,429,544 | B2 | 9/2008 | Grove et al. |
| 7,435,467 | B2 | 10/2008 | Yang |
| 7,438,973 | B2 | 10/2008 | Geddes et al. |
| 10,042,110 | B2 | 8/2018 | Park |
| 2014/0004331 | A1 | 1/2014 | Hida et al. |
| 2021/0395965 | A1 | 12/2021 | Araki et al. |

FOREIGN PATENT DOCUMENTS

| | | | |
|---|---|---|---|
| CN | 104088419 | A | 10/2014 |
| EP | 2993038 | A1 | 3/2016 |
| EP | 2993039 | B1 | 7/2018 |
| JP | 61064438 | | 5/1986 |
| JP | 08012908 | A | 1/1996 |
| JP | 2000044313 | A | 2/2000 |
| JP | 2000326697 | A | 11/2000 |
| JP | 2005060458 | A | 3/2005 |
| JP | 4028287 | B2 | 12/2007 |
| JP | 2009170110 | A | 7/2009 |
| JP | 2010229327 | A | 10/2010 |
| JP | 2007277485 | A | 11/2011 |
| JP | 4923622 | B2 | 4/2012 |
| JP | 5271770 | B2 | 8/2013 |
| JP | 2013180553 | A | 9/2013 |
| JP | 5319163 | B2 | 10/2013 |
| JP | 2014012770 | A | 1/2014 |
| JP | 2016169509 | A | 9/2016 |
| JP | 6132090 | B2 | 5/2017 |
| JP | 2015221519 | A | 6/2017 |
| JP | 6250939 | B2 | 12/2017 |
| JP | 6275532 | B2 | 2/2018 |
| JP | 6317988 | B2 | 4/2018 |
| JP | 2018158961 | A | 10/2018 |
| JP | 2018192637 | A | 12/2018 |
| JP | 2018192792 | A | 12/2018 |
| JP | 2018193420 | A | 12/2018 |
| JP | 2019081376 | A | 5/2019 |
| JP | 2019138133 | A | 8/2019 |
| JP | 3224801 | U | 12/2019 |
| WO | 9700357 | | 1/1997 |
| WO | 2008043373 | A1 | 4/2008 |

OTHER PUBLICATIONS

Moriguchi et al., JP 2009170110, Jul. 30, 2009 (machine translation) (Year: 2009).*

International Search Report for PCT International Application No. PCT/IB2022/050157, mailed on Mar. 29, 2022, 4 pages.

* cited by examiner

*Primary Examiner* — Cheng Yuan Huang

(74) *Attorney, Agent, or Firm* — Lance Vietzke

(57) ABSTRACT

An article with a film adhered includes a film layer, a glass particle-containing layer, and an adherend in this order to facilitate high flame retardance. A laminate used to produce such article.

7 Claims, 2 Drawing Sheets

ARTICLE WITH A FILM ADHERED AND LAMINATE

CROSS REFERENCE TO RELATED APPLICATIONS

This application is a national stage filing under 35 U.S.C. 371 of PCT/IB2022/050157, filed Jan. 10, 2022, which claims the benefit of Japan Application No. 2021-006654, filed Jan. 19, 2021, the disclosure of which is incorporated by reference in its/their entirety herein.

The present disclosure relates to an article with a film adhered and a laminate.

Decorative films that have been imparted with patterns by printing or the like are widely used in decorative applications such as for the inner and outer walls of buildings. In particular, for decorative films used in architectural applications, nonflammability or flame retardance is desirable. For example, decorative films used for building interiors are required to be certified in accordance with laws and regulations such as building standards laws in different countries.

A method of adding a flame retardant to an adhesive on the back surface of a decorative film is known as a method to enhance nonflammability of a decorative film.

Patent Document 1 (JP 2010-229327 A) describes "a non-flammable decorative sheet having an adhesive layer (2) on a lower surface of a thermoplastic resin sheet (1), the adhesive layer (2) comprising from 15 to 60 parts by mass of a bromine-based flame retardant (B), from 5 to 20 parts by mass of an antimony trioxide (C), from 5 to 30 parts by mass of a tackifier (D), and from 0.5 to 5 parts by mass of a polyisocyanate-based curing agent (E) per 100 parts by mass of a (meth)acrylate copolymer (A) having a mass average molecular weight from 200000 to 1500000, wherein, during a heat release test by a cone calorimeter tester in accordance with the fire resistance test method and performance evaluation standard based on Article 2-9 of the Building Standard Law and Article 108-2 of the Building Standard Law Enforcement Order, the maximum heat release rate after the start of heating does not exceed 200 $kW/m^2$ continuously for 10 seconds or longer while the total calorific value is less than or equal to 8 $MJ/m^2$".

Patent Document 2 (JP 2018-192792 A) describes "a decorative sheet 1 including a base film 10 and an adhesive layer 20 provided on at least one side of the base film 10, the adhesive layer containing an adhesive agent, a phosphorus-based flame retardant, and a bromine-based flame retardant, wherein: in a heat release test, the total calorific value of a test piece at a test time of 20 minutes is less than or equal to 7.2 $MJ/m^2$, the test piece being a laminate having a plasterboard with base paper on both sides and the decorative sheet laminated on the side of the plasterboard receiving radiant heat; in an initial tack test, the initial tack is greater than or equal to 5 N/25 mm in an environment of 5° C. and 15 N/25 mm in an environment of 23° C. and 50% RH; and, in a constant load test, the constant load is less than or equal to 5 mm".

SUMMARY

Although flame retardant is effective in improving flame retardance, it is not desirable to use a flame retardant in an article used in a residential environment such as a decorative film for the interior.

The present disclosure provides an article with a film adhered having high flame retardance and a laminate that can be used to produce such an article.

The present inventors discovered that by using a glass particle-containing layer separately from a film layer as a layer constituting an article with a film adhered, it is possible to realize fireproof performance required by a standard such as a building standards law without the need for a flame retardant.

An embodiment provides an article with a film adhered having a film layer, a glass particle-containing layer, and an adherend in this order.

Another embodiment provides a laminate having a film layer and a glass particle-containing layer disposed on the film layer.

According to the present disclosure, it is possible to realize high flame retardance even when a flame retardant is not used in the article with a film adhered.

Note that the above description is not construed as disclosure of all of embodiments of the present invention and advantages related to the present invention.

DESCRIPTION OF EMBODIMENTS

Figure 1:
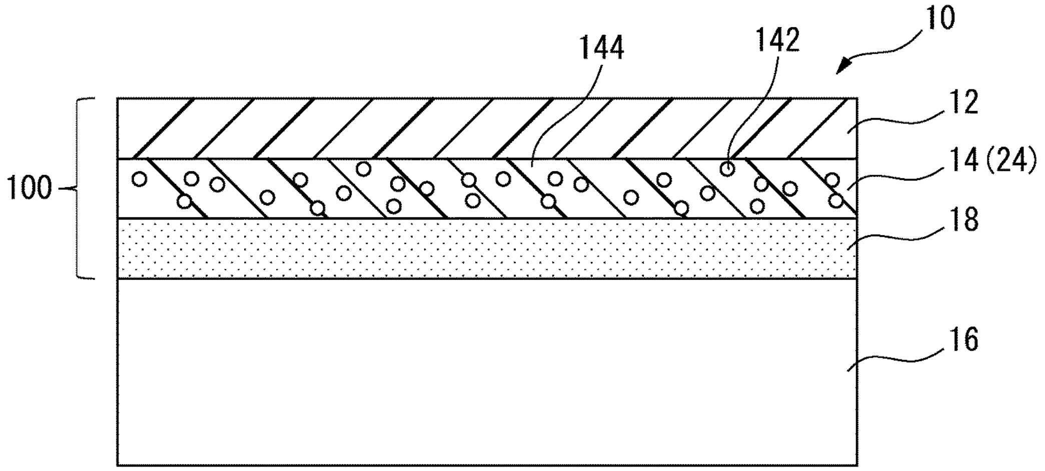
FIG. 1 is a schematic cross-sectional view of an article of the first embodiment and a laminate of an embodiment.

Hereinafter, the present invention will be described in more detail with reference to the drawings for the purpose of illustrating representative embodiments of the present invention, but the present invention is not limited to these embodiments.

In the present disclosure, the term "film" encompasses articles referred to as "sheets".

In the present disclosure, "pressure-sensitive adhesive" refers to the characteristic of a material or composition that the material or composition adheres to various surfaces with just light pressure for a short time in the temperature range of usage, such as from 0° C. to 50° C., and does not exhibit a phase change (from liquid to solid).

In the present disclosure, "adhesive(ness)" is used interchangeably with "pressure-sensitive adhesive".

In the present disclosure, "disposed on" refers to not only the case of being directly disposed on, but also the case of being indirectly disposed on, that is, disposed on via another material or layer.

An article with a film adhered according to an embodiment includes a film layer, a glass particle-containing layer, and an adherend in this order. The glass particle-containing layer located between the film layer and the adherend softens or melts at an elevated temperature to form a thin glass film between the adherend and the film layer. The formed thin glass film acts as a barrier layer to block or suppress the flow of oxygen, flammable gas, and the like between the adherend and the film layer, making it possible to render the article with the film adhered flame-retardant as a whole. By providing the glass particle-containing layer separately from the film layer, flame retardance can be imparted to the article without adversely affecting the appearance of the film layer, such as surface glossiness or transparency, and mechanical properties of the film layer, such as tensile strength or flexural strength.

The material and shape of the adherend is not limited as long as the adherend is an article to which a film can be adhered. Examples of the adherend include plasterboard, mortar, cement, concrete, wood, stone, paper, cloth, glass, plastic, porous ceramics, brick, rock wool acoustic board, and calcium silicate board. The plasterboard may have one side or both sides coated with paper. The adherend is not limited to a plate-like shape such as a wall material and may have a rod-like shape, a film-like shape, a spherical shape, an irregular shape, or another three-dimensional shape.

In an embodiment, the adherend contains at least one selected from the group consisting of plasterboard, calcium silicate board, flame-retardant plywood, and mortar. In this embodiment, the article can be used as a fireproof wall covering material.

Examples of the material of the film layer include polyolefins such as polyethylene and polypropylene, polyesters such as polyethylene terephthalate and polyethylene naphthalate, polystyrene, polyvinyl chloride, polyvinyl acetate, polyurethane, vinyl chloride-vinyl acetate copolymers, acrylic resins, acrylic urethane resins, polycarbonates, cellulose, and fluorine resins such as polytetrafluoroethylene and polyvinylidene fluoride, as well as blends thereof.

In an embodiment, the film layer contains polyvinyl chloride. Polyvinyl chloride, which has outstanding flame retardance, is possible to further enhance the fireproof performance of the article.

The film layer may contain other optional components, such as fillers, colorants such as pigments and dyes, heat stabilizers, UV absorbing agents, and antioxidants.

The film layer may be a single layer, or may be a laminate of a plurality of layers. The film layer may have undergone surface treatment such as embossing treatment, primer treatment, corona treatment, and plasma treatment, and may further contain a decorative layer such as a printed layer, a plated layer, and a vapor deposited layer, or a surface-protecting layer such as a hard coat layer.

The thickness of the film layer may be, for example, greater than or equal to approximately 10 μm, greater than or equal to approximately 30 μm, or greater than or equal to approximately 50 μm, or may be less than or equal 15 to 400 μm, less than or equal to 300 μm, or than or equal to 200 μm. By setting the thickness of the film layer to be within the range described above, an article having excellent flame retardance can be obtained.

The glass particles contained in the glass particle-containing layer are not particularly limited, and examples thereof include glass frits, glass balloons, and glass beads. It is advantageous that the glass particles are glass frits from the perspective that materials with various softening points can be selected.

Examples of the glass particles include the ones that use silicon oxide ($SiO_2$), phosphorus oxide ($P_2O_5$), or boron oxide ($B_2O_3$) as the first component. The glass particles may further optionally contain at least one element selected from the group consisting of Li, Na, K, Be, Mg, Ca, Sr, Zn, B, Al, Pb, and P which is different from the elements contained in the first component. Specific examples of the material of the glass particle include soda lime glass, borate glass, borosilicate glass, phosphate glass, and aluminophosphate glass. The glass particles are preferably free of lead.

The softening point of the glass particles may be, for example, higher than or equal to approximately 300° C., higher than or equal to approximately 320° C., or higher than or equal to approximately 340° C., or may be lower than or equal to approximately 900° C., lower than or equal to approximately 850° C., or lower than or equal to approximately 800° C. By setting the softening point of the glass particles to be higher than or equal to approximately 300° C., it is possible to secure the stability of the shape of the article in a relatively high temperature range in which flame does not occur. By setting the softening point of the glass particles to be lower than or equal to approximately 900° C., the thin glass film can be quickly formed at a high temperature such as in an environment that is exposed to flame.

The average particle size of the glass particles may be, for example, greater than or equal to approximately 1 μm, greater than or equal to approximately 3 μm, or greater than or equal to approximately 5 μm, or may be less than or equal to approximately 60 μm, less than or equal to approximately 50 μm, or less than or equal to approximately 40 μm. By setting the average particle size of the glass particles to be greater than or equal to approximately 1 μm, resin dispersibility can be improved. By setting the average particle size of the glass particles to be approximately less than or equal to 60 μm, surface smoothness of the article can be secured. The average particle size of the glass particles is the particle diameter at 50% of the cumulative volume ($D_{50}$) measured using a laser diffraction/scattering-type particle size distribution measuring device.

The content of glass particles in the glass particle-containing layer may be, for example, greater than or equal to approximately 4 mass %, greater than or equal to approximately 6 mass %, or greater than or equal to approximately 8 mass %, or may be less than or equal to approximately 85 mass %, less than or equal to approximately 70 mass %, or less than or equal to approximately 50 mass %. By setting the content of glass particles in the glass particle-containing layer to be greater than or equal to approximately 4 mass %, flame retardance performance can be imparted to the article. By setting the content of glass particles in the glass particle-containing layer to be less than or equal to approximately 85 mass %, interlayer adhesion of the article can be secured.

The thickness of the glass particle-containing layer may be, for example, greater than or equal to approximately 10 μm, greater than or equal to approximately 15 μm, or greater than or equal to approximately 20 μm, or may be less than or equal to approximately 220 μm, less than or equal to approximately 100 μm, or less than or equal to approximately 50 μm. By setting the thickness of the glass particle-containing layer to be greater than or equal to approximately 10 μm, interlayer adhesion of the article can be secured. By setting the thickness of the glass particle-containing layer to be less than or equal to approximately 220 μm, surface smoothness of the article can be secured.

It is advantageous that content of glass particles in the glass particle-containing layer per unit area is greater than or equal to approximately 30 $g/m^2$, greater than or equal to approximately 45 $g/m^2$, or greater than or equal to approximately 60 $g/m^2$, or less than or equal to approximately 600 $g/m^2$, less than or equal to approximately 300 $g/m^2$, or less than or equal to approximately 150 $g/m^2$. With this, it is possible to use a small amount of glass particles to efficiently form a thin glass film having the thickness necessary to impart the desired fireproof performance to the region of the article corresponding to the glass particle-containing layer.

The glass particle-containing layer may contain a binder or an adhesive.

Organic binders such as an acrylic resin, a polyurethane, a polyolefin, a polyester, a rubber-based resin, a silicone resin, a vinyl acetate resin, or blends thereof can be used as the binder. Inorganic binders such as ammonium polyphosphate, layered silicate mineral clay, an alkali metal silicate aqueous solution, or blends thereof can also be used as the binder.

An acrylic resin, a polyurethane, a polyolefin, a polyester, a rubber-based resin, a silicone-based resin, or a vinyl acetate resin, or blends thereof can be used as the adhesive. The adhesive may be also a pressure-sensitive adhesive containing a tacky adhesive polymer. It is advantageous that the adhesive contains an acrylic adhesive from the perspective of weather resistance and transparency.

The binder or adhesive may contain other optional components, such as fillers, colorants such as pigments and dyes, heat stabilizers, UV absorbing agents, and antioxidants. These optional components may be dissolved or dispersed in the binder or adhesive. In an embodiment, the binder or adhesive contains a white pigment such as titanium oxide. In this embodiment, the adherend surface can be concealed.

In a first embodiment, the article further includes an adhesive layer between the glass particle-containing layer and the adherend, in which: the glass particle-containing layer is a buffer layer that is in contact with the film layer and the adhesive layer; and the buffer layer contains a binder and glass particles dispersed in the binder.

FIG. 1 illustrates a schematic cross-sectional view of the article of the first embodiment. An article 10 includes a film layer 12, a glass particle-containing layer 14, and an adherend 16, and further includes an adhesive layer 18 between the glass particle-containing layer 14 and the adherend 16. The glass particle-containing layer 14 is a buffer layer 24 that is in contact with the film layer 12 and the adhesive layer 18. The buffer layer 24 contains a binder 144 and glass particles 142 dispersed in the binder.

The adhesive layer may contain, for example, an acrylic resin, a polyurethane, a polyolefin, a polyester, a rubber-based resin, a silicone-based resin, or a vinyl acetate resin, or blends thereof. The adhesive layer may be a pressure-sensitive adhesive layer containing a tacky adhesive polymer. It is advantageous that the adhesive layer contains an acrylic adhesive from the perspective of weather resistance and transparency. The adhesive layer may be free of, or may contain, glass particles such as those contained in the buffer layer.

The thickness of the adhesive layer may be, for example, greater than or equal to approximately 5 μm, greater than or equal to approximately 10 μm, or greater than or equal to approximately 20 μm, or may be less than or equal to approximately 200 μm, less than or equal to approximately 100 μm, or less than or equal to approximately 50 μm. By setting the thickness of the adhesive layer to be greater than or equal to approximately 5 μm, adhesion to various substrates can be secured. By setting the thickness of the adhesive layer to be less than or equal to approximately 200 μm, it is possible to form an adhesive layer economically and efficiently.

The glass particles and binder contained in the buffer layer (glass particle-containing layer) are the same as in the description above. The binder is preferably an organic binder such as an acrylic resin, a polyurethane, a polyolefin, a polyester, a rubber-based resin, a silicone resin, a vinyl acetate resin, a vinyl chloride resin, or blends thereof, more preferably an acrylic resin, due to their excellent adhesion to both the film layer and the adhesive layer. More preferably, the binder is an acrylic resin.

The thickness of the buffer layer (glass particle-containing layer) may be, for example, greater than or equal to approximately 10 μm, greater than or equal to approximately 15 μm, or greater than or equal to approximately 20 μm, or may be less than or equal to approximately 100 μm, less than or equal to approximately 70 μm, or less than or equal to approximately 50 μm. By setting the thickness of the buffer layer to be greater than or equal to approximately 10 μm, interlayer adhesion of the article can be secured. By setting the thickness of the buffer layer to be less than or equal to approximately 100 μm, surface smoothness of the article can be more effectively secured.

In a second embodiment, the article further includes an adhesive layer between the film layer and the glass particle-containing layer, in which: the glass particle-containing layer is a primer layer that is in contact with the adherend and the adhesive layer; and the primer layer contains a binder and glass particles dispersed in the binder.

Figure 2:
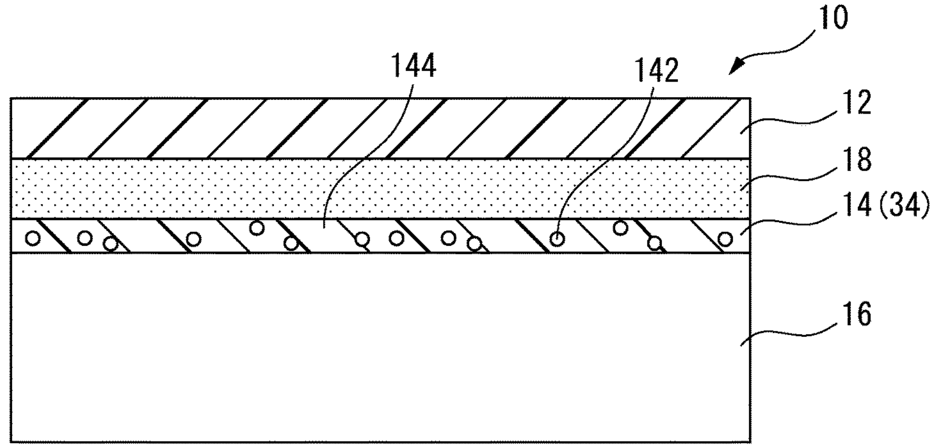
FIG. 2 is a schematic cross-sectional view of an article of the second embodiment.

FIG. 2 illustrates a schematic cross-sectional view of the article of the second embodiment. An article 10 includes a film layer 12, a glass particle-containing layer 14, and an adherend 16, and further includes an adhesive layer 18 between the film layer 12 and the glass particle-containing layer 14. The glass particle-containing layer 14 is a primer layer 34 that is in contact with the adherend 16 and the adhesive layer 18. The primer layer 34 contains a binder 144 and glass particles 142 dispersed in the binder.

The adhesive layer is the same as in the description in the first embodiment.

The glass particles and binder contained in the primer layer (glass particle-containing layer) are the same as in the description above. When the adherend includes an inorganic material such as plasterboard, the binder is preferably an inorganic binder such as ammonium polyphosphate, layered silicate mineral clay, an alkali metal silicate aqueous solution, or blends thereof.

The weight per unit area of the primer layer (glass particle-containing layer) may be, for example, greater than or equal to approximately 10 g/m$^2$, greater than or equal to approximately 15 g/m$^2$, or greater than or equal to approximately 20 g/m$^2$, or may be less than or equal to approximately 70 g/m$^2$, less than or equal to approximately 60 g/m$^2$, or less than or equal to approximately 50 g/m$^2$. By setting the weight per unit area of the primer layer to be greater than or equal to approximately 10 g/m$^2$, stable combustion inhibition effect can be obtained. By setting the thickness of the primer layer to be less than or equal to approximately 70 g/m$^2$, it is possible to form a primer layer economically and efficiently.

The thickness of the primer layer (glass particle-containing layer) may be, for example, greater than or equal to approximately 10 μm, greater than or equal to approximately 15 μm, or greater than or equal to approximately 20 μm, or may be less than or equal to approximately 100 μm, less than or equal to approximately 70 μm, or less than or equal to approximately 50 μm. By setting the thickness of the primer layer to be greater than or equal to approximately 10 μm, interlayer adhesion of the article can be secured. By setting the thickness of the primer layer to be less than or equal to approximately 100 μm, surface smoothness of the article can be more effectively secured.

In a third embodiment, the glass particle-containing layer is an adhesive layer that is in contact with the adherend.

Figure 3:
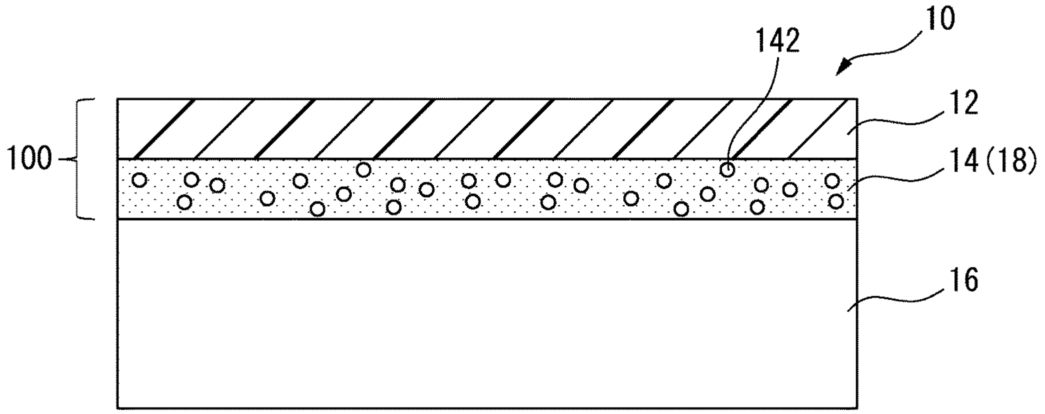
FIG. 3 is a schematic cross-sectional view of an article of the third embodiment and a laminate of another embodiment.

FIG. 3 illustrates a schematic cross-sectional view of the article of the third embodiment. An article 10 includes a film layer 12, a glass particle-containing layer 14, and an adherend 16. The glass particle-containing layer 14 is an adhesive layer 18 that is in contact with the adherend 16.

The material of the adhesive layer (glass particle-containing layer) are the same as in the description in the first embodiment. It is desirable that the glass particles are evenly dispersed in the adhesive.

The thickness of the adhesive layer (glass particle-containing layer) may be, for example, greater than or equal to approximately 5 μm, greater than or equal to approximately 10 μm, or greater than or equal to approximately 20 μm, or may be less than or equal to approximately 100 μm, less than or equal to approximately 70 μm, or less than or equal to approximately 50 μm. By setting the thickness of the adhesive layer to be greater than or equal to approximately 5 μm, adhesion to various substrates can be secured. By setting the thickness of the adhesive layer to be less than or equal to approximately 100 μm, it is possible to form an adhesive layer economically and efficiently.

An embodiment provides a laminate including a film layer and a glass particle-containing layer disposed on the film layer. The laminate can be used to produce the article described above. The film layer and the glass particle-containing layer are the same as in the description regarding the article described above.

The laminate may further include an adhesive layer disposed on the glass particle-containing layer on the opposite side of the film layer. The adhesive layer is the same as in the above description regarding the article.

FIG. 1 illustrates a laminate 100 adhered to an adherend 16. The laminate 100 includes a film layer 12, a glass particle-containing layer 14 disposed on the film layer 12, in which the glass particle-containing layer 14 is at the lower side of the film layer 12 in the drawing, and an adhesive layer 18.

The glass particle-containing layer may include glass particles and an adhesive for adhering the laminate to an adherend. In this embodiment, the surface of the glass particle-containing layer of the laminate may be protected by a release liner.

FIG. 3 illustrates a laminate 100 adhered to an adherend 16. The laminate 100 includes a film layer 12 and a glass particle-containing layer 14, in which the glass particle-containing layer 14 is an adhesive layer 18 containing glass particles 142 and an adhesive.

The article with a film adhered can be produced, for example, by a method including the following steps. A glass particle-containing composition containing glass particles, a binder or an adhesive, and, as needed, an additional component such as a solvent, a viscosity modifier, a defoamer, a leveling agent, a UV absorbing agent, an antioxidant, a pigment, or a dye, is applied onto a film layer and dried by heating as necessary to form a laminate including a film layer and a glass particle-containing layer disposed on the film layer. The preparation of the glass particle-containing composition can be performed by mixing components using a mixing device, such as a homo mixer or a planetary mixer.

When the glass particle-containing layer is a buffer layer containing a binder, an adhesive composition containing an adhesive and, as needed, an additional component such as a solvent, a viscosity modifier, a defoamer, a leveling agent, a UV absorbing agent, an antioxidant, a pigment, or a dye, is applied onto the glass particle-containing layer and dried by heating as necessary to form an adhesive layer disposed on the glass particle-containing layer at the opposite side of the film layer.

The application of the glass particle-containing composition and the adhesive composition can be performed by using, for example, a knife coater, a gravure coater, a roll coater, a die coater, or a bar coater. The heating and drying after the application can be performed, for example, at a temperature of from 60° C. to 120° C. for several tens of seconds to 10 minutes.

Prior to formation of the glass particle-containing layer, the film layer may be primed or subjected to surface treatment such as corona treatment or flame treatment as necessary.

Thereafter, the article with a film adhered can be produced by having the adhesive layer of the laminate face the adherend and adhere the laminate and the adherend together. When adhering the laminate and the adherend together, the laminate may be pressed against the adherend surface by a tool such as a roller, or may be by rubbing by hand.

The article with a film adhered can also be produced, for example, by a method including the following steps. A primer composition containing glass particles, a binder or a solvent or both, and, as needed, an additional component such as a viscosity modifier, an defoamer, a leveling agent, a UV absorbing agent, or an antioxidant, is applied onto an adherend and dried by heating as necessary to form a primer layer on the adherend.

The application of the primer composition can be performed by using, for example, a knife coater, a gravure coater, a roll coater, a die coater, or a bar coater. The heating and drying after the application can be performed, for example, at a temperature from 60° C. to 120° C. for several tens of seconds to 10 minutes.

Thereafter, the article with a film adhered can be produced by having the adhesive layer of the laminate having a film layer and an adhesive layer face the primer layer formed on the adherend and adhere the laminate and the adherend together. When adhering the laminate and the adherend together, the laminate may be pressed against the adherend surface by a tool such as a roller, or may be by rubbing by hand.

In the article according to an embodiment, the total calorific value measured in accordance with the ISO 5660-1:2015 cone calorimeter test in a total of 20 minutes is less than or equal to approximately 8 $MJ/m^2$, or less than or equal to approximately 7.8 $MJ/m^2$, or less than or equal to approximately 7.5 $MJ/m^2$.

In the article according to an embodiment, the total time for which the heat release rate measured in accordance with the ISO 5660-1:2015 cone calorimeter test exceeds 200 $kW/m^2$ is less than or equal to approximately 10 seconds, or less than or equal to approximately 8 seconds, or less than or equal to approximately 5 seconds.

The article with a film adhered and the laminate according to the present disclosure can be used in various fields where flame retardance is required, such as for buildings, automobiles, airplanes, ships, trains and electric/electronic devices.

EXAMPLES

In the following examples, specific embodiments of the present disclosure will be exemplified, but the present invention is not limited to those embodiments. All parts and percent are based on mass unless otherwise specified.

The raw materials used in the production of the laminate and the article are shown in Table 1.

TABLE 1

| | Composition or description[1)] | Supplier |
|---|---|---|
| Tacky adhesive polymer 1 (ADH1) | A 60 mass % EtOAc solution in which 2EHA-BA-AA is 62:32:6, Tg is −57° C., and weight average molecular weight (Mw) is 290000 | — |
| Tacky adhesive polymer 2 (ADH2) | A 38 mass % EtOAc solution in which BA-AA is 94:6, Tg is −48° C., and weight average molecular weight (Mw) is 650000 | — |
| Dispersant 1 (D1) | A 40 mass % EtOAc solution in which MMA-BMA-DMAEMA is 60:34:6, Tg is 63° C., and weight average molecular weight (Mw) is 68000 | — |
| Crosslinking agent 1 (CL1) | Epoxy crosslinking agent E-5XM (N,N,N',N'-tetrakis(2,3-epoxypropyl)-m-xylene-α,α'-diamine), 5 mass % MEK solution | Soken Chemical & Engineering Co., Ltd. (Toshima-ku, Tokyo, Japan) |
| Crosslinking agent 2 (CL2) | Coronate (trade name) L-55E, Toluene diisocyanate type cross-linking agent, 55 mass % ethyl acetate solution | Tosoh Corporation (Minato-ku, Tokyo, Japan) |
| Glass frits 1 (GL1) | CH1538, $SiO_2$ type, softening point is 800° C., D50 is 13 μm | Takara Standard Co. Ltd. (Osaka-shi, Osaka, Japan) |
| Glass frits 2 (GL2) | TH1368, $SiO_2$—$B_2O_3$ type, softening point is 820° C., D50 is 13 μm | Takara Standard Co. Ltd. (Osaka-shi, Osaka, Japan) |
| Glass frits 3 (GL3) | VY0144, $P_2O_5$—$Al_2O_3$ type, softening point is 404° C., D50 is 17 μm | Takara Standard Co. Ltd. (Osaka-shi, Osaka, Japan) |
| Glass frits 4 (GL4) | CY0086, $B_2O_3$—ZnO type, softening point is 569° C., D50 is 11 μm | Takara Standard Co. Ltd. (Osaka-shi, Osaka, Japan) |
| Glass frits 5 (GL5) | CY5600, $B_2O_3$ type, softening point is 630° C., D50 is 15 μm | Takara Standard Co. Ltd. (Osaka-shi, Osaka, Japan) |
| Glass frits 6 (GL6) | PANA84, $P_2O_5$ type, softening point is 400° C., D50 is 12 μm | Takara Standard Co. Ltd. (Osaka-shi, Osaka, Japan) |
| Glass frits 7 (GL7) | TH1368, $SiO_2$—$B_2O_3$ type, softening point is 820° C., D50 is 7 μm | Takara Standard Co. Ltd. (Osaka-shi, Osaka, Japan) |
| Glass frits 8 (GL8) | TH1368, $SiO_2$—$B_2O_3$ type, softening point is 820° C., D50 is 30 μm | Takara Standard Co. Ltd. (Osaka-shi, Osaka, Japan) |
| Glass frits 9 (GL9) | Ceradyne (trade name), lead-free low-melting-point glass powder V2211, $SiO_2$—$Bi_2O_3$—ZnO—$B_2O_3$—SrO—$ZrO_2$, softening point is 484° C. | 3M Japan Ltd. (Shinagawa-ku, Tokyo, Japan) |
| Glass frits 10 (GL10) | Ceradyne (trade name), low-melting-point glass powder 24936, $PbO_2$—ZnO—$B_2O_3$, softening point is 330° C. | 3M Japan Ltd. (Shinagawa-ku, Tokyo, Japan) |
| Film 1 (FL1) | White PVC film having a thickness of 170 μm formed by calendering, polyvinyl chloride/ester plasticizer/organic stabilizer (acrylic resin, zinc stearate, and the like)/pigments (Titanium oxide, and the like) is 61.5/13.6/3.2/21.7 (mass ratio) | — |
| Film 2 (FL2) | Pigmented PVC film having a thickness of 135 μm formed by calendering, polyvinyl chloride/ester plasticizer/organic stabilizer (acrylic resin, zinc stearate, and the like)/organic pigment is 66.5/19.5/12.7/1.3 (mass ratio) | — |
| Cloisite 20A | Montmorillonite clay | BYK-Chemie GmbH (Wesel, Nordrhein-Westfalen, Germany) |
| WP-2000 | Chloroprene rubber based aqueous primer, approximately 48 mass % aqueous solution | 3M Japan Ltd. (Shinagawa-ku, Tokyo, Japan) |
| AP420 | Low molecular weight ammonium polyphosphate (APP), approximately 45 mass % aqueous solution | Clariant International AG (Muttenz, Basel-Landschaft, Switzerland) |

[1)] BA: n-butyl acrylate; 2EHA: 2-ethylhexyl acrylate; AA: acrylic acid
MMA: methyl methacrylate; BMA: butyl methacrylate; DMAEMA: dimethylaminoethyl methacrylate
EtOAc: ethyl acetate; MEK: methyl ethyl ketone Example 1

A slurry containing dispersant 1 (D1) and glass frits 5 (GL5) was prepared. The mass ratio of D1 to GL5 was 100:500 on the basis of non-volatile content. Film 1 (FL1) was coated with the slurry by using a knife coater. The slurry layer was dried at 65° C. for 3 minutes. After drying, a buffer layer having a thickness of 39 μm was obtained.

Tacky adhesive polymer 1 (ADH1) and crosslinking agent 1 (CL1) were mixed to obtain an adhesive mixed solution. The mass ratio of ADH1 to CL1 was 100:0.25 on the basis of non-volatile content. A silicone-treated polyethylene-laminated paper liner was coated with the adhesive mixed solution by using a knife coater. The adhesive layer was dried at 95° C. for 5 minutes. After drying, an adhesive layer having a thickness of 38 μm was obtained. The laminate of Example 1 was obtained by adhering the adhesive layer and the buffer layer on FL1 together.

Comparative Example 1

A laminate of Comparative Example 1 was obtained by the same procedure as in Example 1 with the exception that the adhesive layer and FL1 were directly adhered together without a buffer layer being formed on FL1.

Example 2

An adhesive mixed solution containing ADH1 and glass frits 1 (GL1) was prepared. The mass ratio of ADH1 to GL1 was 100:30 on the basis of non-volatile content. CL1 was added to the adhesive mixed solution and mixed. The mass ratio of ADH1 to CL1 was 100:0.18 on the basis of non-volatile content. A silicone-treated polyethylene-laminated paper liner was coated with the adhesive mixed solution by using a knife coater. The adhesive layer was dried at 95° C. for 5 minutes. After drying, an adhesive layer with a thickness of 45 μm was obtained. The laminate of Example 2 was obtained by adhering the adhesive layer and FL1 together.

Example 3 to Example 11

Laminates of Examples 3 to 11 were obtained by the same procedure as in Example 2 with the exception that the type and compounded amount of glass frits were changed in accordance with the description in Table 3.

Comparative Example 2

A laminate of Comparative Example 2 was obtained by the same procedure as in Example 2 with the exception that GL1 was not used.

Fireproof Performance Test 1

A plasterboard (100 mm by 100 mm square with a thickness of 12.5 mm) was coated with the 3M (trade name) DI-NOC (trade name) primer DP900N3 (available from 3M Japan Ltd. based in Shinagawa-ku, Tokyo, Japan). The laminate was applied to the primer-coated surface of the plasterboard. The heat release rate (kW/m$^2$) and total calorific value (MJ/m$^2$) were measured using a cone calorimeter (available from Toyo Seiki Seisaku-sho, Ltd. based in Kita-ku, Tokyo, Japan) in accordance with ISO 5660-1:2015 under the condition of a radiant heat of 50 kW/m$^2$. When the total time of heat release rate exceeding 200 kW/m$^2$ was less than or equal to 10 seconds and the total calorific value in two minutes was less than or equal to 8 MJ/m$^2$, the result was "pass", otherwise "fail".

The results of Example 1 and Comparative Example 1 are shown in Table 2.

TABLE 2

| | Adhesive layer | | | Buffer layer | | ISO |
|---|---|---|---|---|---|---|
| | Tacky adhesive polymer | Thickness [μm] | Glass frits | thickness [μm] | Film layer | 5660-1 test |
| EXAMPLE 1 | ADH1 | 38 | GL5 | 39 | FL1 | PASS |
| COMPARATIVE EXAMPLE 1 | ADH1 | 38 | — | — | FL1 | FAIL |

Adhesive Force

A test piece was prepared by cutting a laminate into a rectangular shape having a width of 25 mm and a length of 150 mm. The test piece was adhered to an electrogalvanized steel sheet having a phosphoric acid coating (SECC-P, with a thickness of 1 mm, available from Paltek Corporation based in Hiratsuka-shi, Kanagawa, Japan) at 20° C. The adhering method was in accordance with JIS Z 0237:2009 10.2.4. The test piece was left at 20° C. for 24 hours. Using a tensile tester (Tensilon universal testing machine, model: RTC-1210A, available from A&D Company, Limited based in Toshima-ku, Tokyo, Japan), the adhesive force at the time of performing 90 degree peeling was measured at a peeling rate of 300 mm/min at 20° C.

The results of Examples 2 to 11 and Comparative Example 2 are shown in Table 3.

TABLE 3

| | Adhesive layer | | | | | | |
|---|---|---|---|---|---|---|---|
| | Tacky adhesive polymer | Thickness [μm] | Glass frits Type | Glass frits Part by mass | Film layer | ISO 5660-1 Test | Adhesive force [N/25 mm] |
| Example 2 | ADH1 | 45 | GL1 | 30 | FL1 | PASS | 14 |
| Example 3 | ADH1 | 41 | GL2 | 30 | FL1 | PASS | 12 |

TABLE 3-continued

| | Adhesive layer | | | | | | |
|---|---|---|---|---|---|---|---|
| | Tacky | | Glass frits | | | ISO | Adhesive |
| | adhesive polymer | Thickness [μm] | Type | Part by mass | Film layer | 5660-1 Test | force [N/25 mm] |
| Example 4 | ADH1 | 41 | GL3 | 30 | FL1 | PASS | 15 |
| Example 5 | ADH1 | 40 | GL4 | 30 | FL1 | PASS | 16 |
| Example 6 | ADH1 | 41 | GL5 | 30 | FL1 | PASS | 14 |
| Example 7 | ADH1 | 40 | GL6 | 30 | FL1 | PASS | 14 |
| Example 8 | ADH1 | 41 | GL7 | 30 | FL1 | PASS | 14 |
| Example 9 | ADH1 | 41 | GL8 | 30 | FL1 | PASS | 13 |
| Example 10 | ADH1 | 42 | GL6 | 10 | FL1 | PASS | 16 |
| Example 11 | ADH1 | 39 | GL6 | 50 | FL1 | PASS | 11 |
| Comparative Example 2 | ADH1 | 38 | — | — | FL1 | FAIL | 18 |

Example 12

Tacky adhesive polymer 2 (ADH2) and crosslinking agent 2 (CL2) were mixed to obtain an adhesive mixed solution. The mass ratio of ADH2 to CL2 was 97:3 on the basis of non-volatile content. An adhesive film with an adhesive layer having a thickness of 25 μm formed was prepared by coating film 2 (FL2) with the adhesive mixed solution. A primer composition with a solid content of 74 mass % was prepared by mixing glass frits 9 (GL9) and WP-2000. Using a syringe and a spatula, a plasterboard (100 mm by 100 mm square having a thickness of 12.5 mm) was coated with the primer composition and dried for 24 hours at room temperature to produce a plasterboard with a primer layer having a mass of 0.48 g formed. The article of Example 12 was produced by applying the adhesive film onto the primer layer of the plasterboard.

Example 13

A primer composition was prepared by mixing glass frits 10 (GL10), Cloisite 20A, AP420, and water. The mass ratio of GL10 to Cloisite 20A, AP420, and water was 2:2:5:10. Using a syringe and a spatula, a plasterboard (100 mm by 100 mm square having a thickness of 12.5 mm) was coated with the primer composition and dried for 24 hours at room temperature to produce a plasterboard with a primer layer having a mass of 0.2 g formed. The article of Example 13 was prepared by applying the adhesive film produced in Example 12 onto the primer layer of the plasterboard.

Example 14

A plasterboard was coated with the primer composition of Example 13 to form a primer layer: then, the primer layer was coated with two more layers in the same procedure to produce a plasterboard with a primer layer formed that is approximately three times the mass of the primer layer of Example 13. The article of Example 14 was prepared by applying the adhesive film produced in Example 12 onto the primer layer of the plasterboard.

Fireproof Performance Test 2

The heat release rate (kW/m$^2$) and total calorific value (MJ/m$^2$) of the articles produced in Examples 12 to 14 were measured using a cone calorimeter (available from Fire Testing Technology Limited based in East Grinstead, West Sussex, UK) in accordance with ISO 5660-1:2015 under the condition of a radiant heat of 50 kW/m$^2$. The fire growth rate (FIGRA) was calculated as the peak heat release rate divided by the time to the peak. An article in which the adhesive film of Example 12 was adhered to a plasterboard with no primer layer formed was used as a control: in the same manner as above, the heat release rate and the total calorific value of the article were measured, and the fire growth rate of the article was calculated. The results of Examples 12 to 14 and the control are shown in Table 4.

TABLE 4

| | Total calorific value (MJ/m$^2$) | Peak heat release rate (kW/m$^2$) | Fire growth rate [kW/(m$^2$ · s)] |
|---|---|---|---|
| Control | 9.5 | 200 | 13 |
| Example 12 | 7.8 | 138 | 7.7 |
| Example 13 | 7.3 | 217 | 11 |
| Example 14 | 8.3 | 153 | 8.3 |

Figure 4:
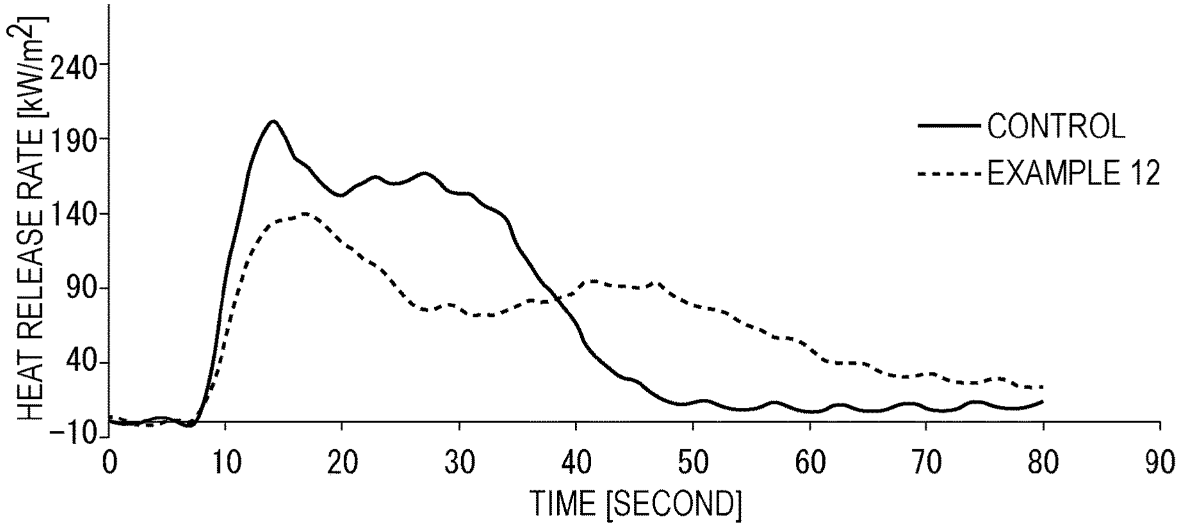
FIG. 4 is a graph illustrating the relationship between heat release rate and time in Example 12 and a control.
Figure 5:
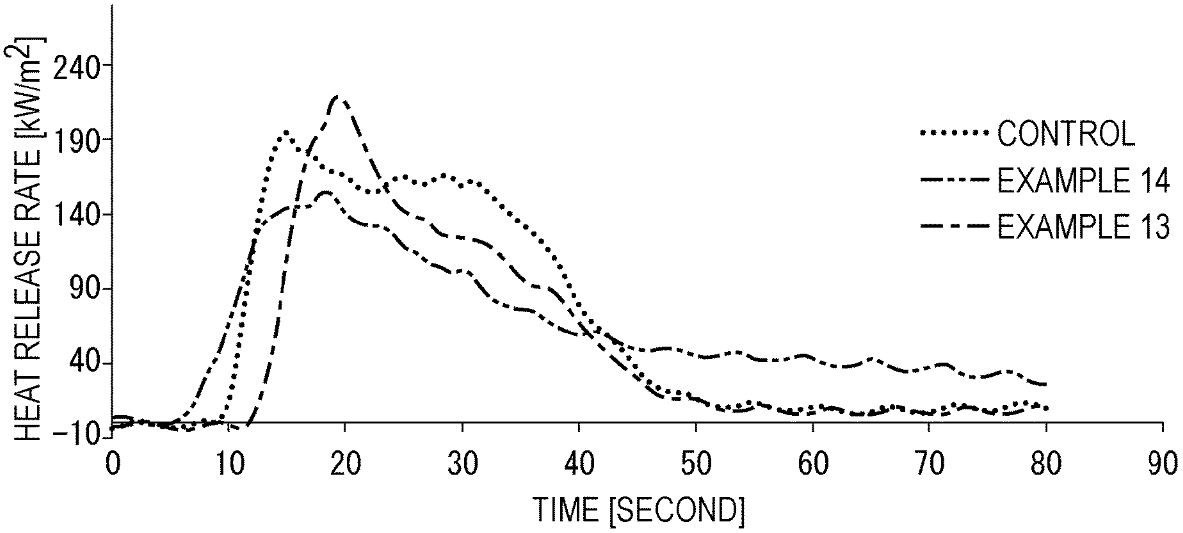
FIG. 5 is a graph illustrating the relationship between heat release rate and time in Example 13, Example 14, and the control.

FIG. 4 is a graph illustrating the relationship between heat release rate and time in Example 12 and the control. FIG. 5 is a graph illustrating the relationship between heat release rate and time in Example 13, Example 14, and the control.

REFERENCE SIGNS LIST

10 Article with a film adhered
12 Film layer
14 Glass particle-containing layer
142 Glass particles
144 Binder
16 Adherend
18 Adhesive layer
24 Buffer layer
34 Primer layer
100 Laminate

The invention claimed is:

1. An article with a film adhered comprising a film layer, a glass particle-containing layer, and an adherend in this order, wherein the article further comprises an adhesive layer between the glass particle-containing layer and the adherend;

the glass particle-containing layer is a buffer layer that is in contact with the film layer and the adhesive layer; and, the buffer layer comprises a binder and glass particles dispersed in the binder, wherein the adherend comprises at least one selected from the group consisting of plasterboard, calcium silicate board, flame-retardant plywood, and mortar.

2. The article according to claim 1, wherein the binder is an acrylic resin.

3. The article according to claim 1, wherein the adhesive layer comprises an acrylic adhesive.

4. The article according to claim 1, wherein the glass particles are glass frits.

5. The article according to claim 1, wherein a softening point of the glass particles is from 300° C. to 900° C.

6. The article according to claim 1, wherein the film layer comprises polyvinyl chloride.

7. The article according to claim 1, wherein a thickness of the glass particle-containing layer is from 10 μm to 220 μm.

* * * * *